(No Model.)
W. H. GORDON.
SEINE HAULING APPARATUS.
No. 371,446. Patented Oct. 11, 1887.
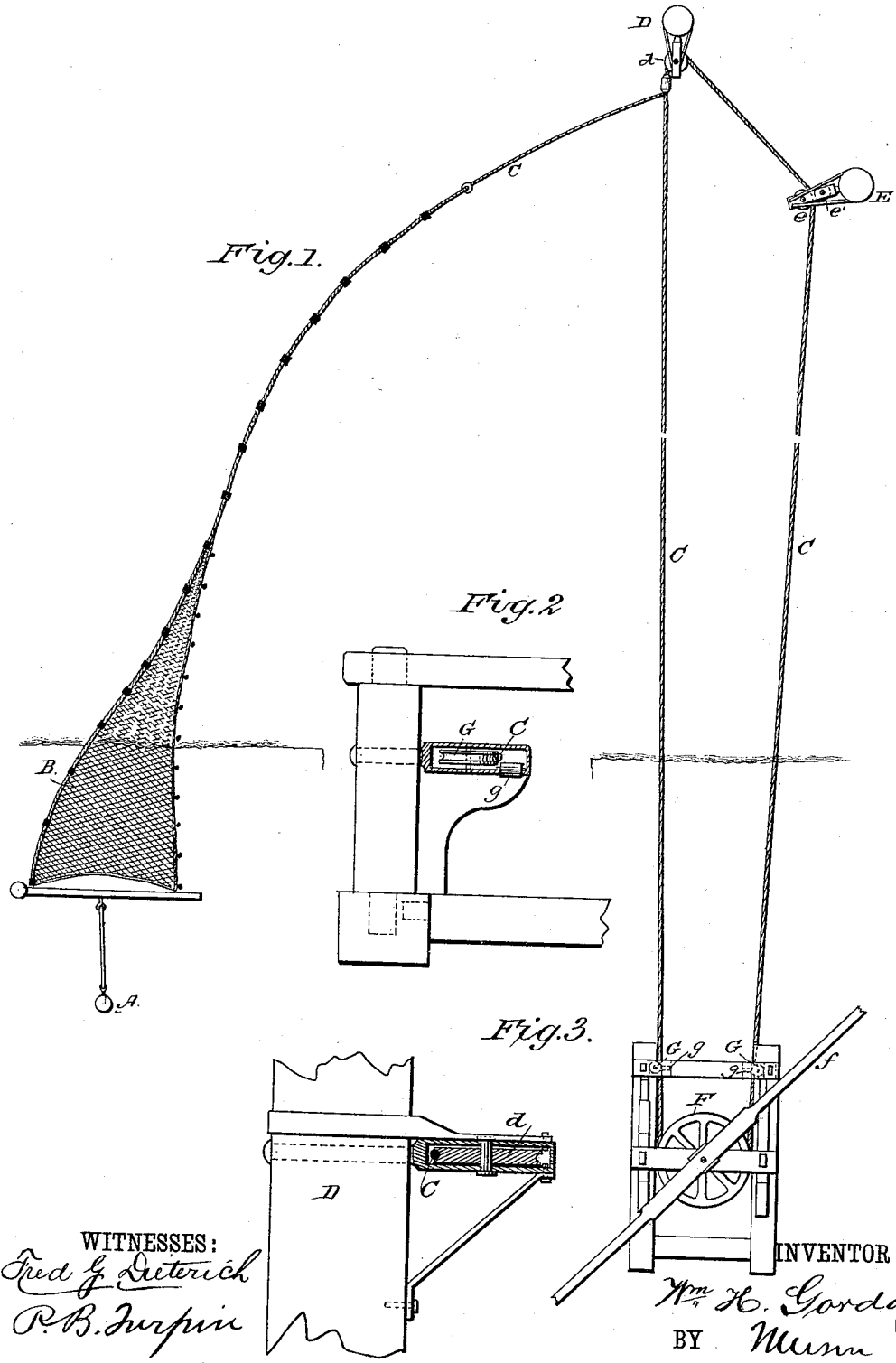
WITNESSES:
Fred G. Dieterich
R. B. Turpin
INVENTOR:
Wm. H. Gordon
BY Munn & Co.
ATTORNEYS.
N. PETERS. Photo-Lithographer, Washington, D. C.

UNITED STATES PATENT OFFICE.

WILLIAM HENRY GORDON, OF BRAMBLETON, VIRGINIA.

SEINE-HAULING APPARATUS.

SPECIFICATION forming part of Letters Patent No. 371,446, dated October 11, 1887.

Application filed June 22, 1887. Serial No. 242,184. (No model.)

*To all whom it may concern:*

Be it known that I, WILLIAM HENRY GORDON, of Brambleton, in the county of Norfolk and State of Virginia, have invented a new and useful Improvement in Seine-Hauling Apparatus, of which the following is a specification.

My invention is an improvement in seine-hauling; and it consists in certain novel constructions and combinations of parts, as will be hereinafter described and claimed.

In the drawings, Figure 1 is a plan view of my invention as in use. Fig. 2 is a detail view of a part of the windlass. Fig. 3 is a detail view of one of the off-shore guide posts and its pulley.

My invention seeks to provide apparatus by which the seine may be cast and landed every tide, no matter what the condition of weather.

The shore-anchor A may be a post or pile, as shown, or other suitable fixture to which to secure one end of the seine B. This seine may be of any suitable construction, and is connected at one end, as stated, to the shore-anchor A. At its opposite end the seine is connected with the cable C, as shown in Fig. 1. This cable is supported by the off-shore guide, which, in the construction shown, comprises posts D E and pulleys supported thereby. The pulley $d$ of post D has its block suitably braced, and the pulley $e$ of post E may be braced in like manner. An inner pulley, $e'$, is provided in the block of pulley $e$, which inner pulley takes the strain when the seine is hauled on the opposite side of the off-shore guides from that shown in Fig. 1. By separating the pulleys $d$ $e$ the cable is prevented from fouling, as will be obvious from the drawings.

It will readily be seen that the net or seine can be cast and landed on either side of the apparatus without altering the main portion thereof.

The cable C is preferably an endless cable passed over the pulleys of the off-shore guide and around the drum F, journaled in the windlass-frame, and which drum may be revolved through the medium of sweep $f$, and by man, horse, or other power. It is preferred to operate the cable in this manner, because thereby great power may be exerted; but it is obvious that I do not desire to limit the broad features of my invention thereto.

In the windlass frame I support lateral or side pulleys, G, and base-pulleys $g$, the general location of which is shown in Fig. 1, while their specific construction may be seen more clearly in Fig. 2. These side and base pulleys receive any lateral outward friction of the incoming and outgoing portions of the cable, while the base-pulleys receive the friction incident to the sagging of the cable.

It will be appreciated that my invention may be handled successfully in such stormy weather as would preclude the use of boats in the ordinary manner, and that thereby no tides will be lost to the fisherman. It will also be understood that by my apparatus the seine may be both cast and hauled from the shore, so that the danger of drowning the fishing crew is avoided.

Having thus described my invention, what I claim as new is—

1. In an apparatus substantially as described, a shore-anchor, a seine connected at one end with said shore-anchor, a cable connected with such seine, an off-shore guide, substantially as described, for supporting or guiding said cable, and means for operating said cable from the shore, combined substantially as set forth.

2. The improved apparatus herein described, comprising the shore-anchor, the seine connected at one end thereto, the off-shore guide consisting of the piles D E and their pulleys, the cable passed over said pulleys and having one end of the seine secured to it, and the windlass to which such cable is secured and by which it may be operated, all substantially as and for the purposes described.

3. In an apparatus substantially as described, the combination of a shore-anchor, a pile secured off shore and forming an off-shore guide, a cable engaging said off-shore guide, and the seine secured at one end to the shore-anchor and at its other end to the cable, substantially as set forth.

WILLIAM HENRY GORDON.

Witnesses:
 E. C. BASS,
 CHAS. J. MANSONI,
 H. C. PERCY.